(12) United States Patent
Mohanaveeramani et al.

(10) Patent No.: US 11,418,127 B2
(45) Date of Patent: Aug. 16, 2022

(54) CONVERTER CELL WITH CROWBAR

(71) Applicant: Hitachi Energy Switzerland AG, Baden (CH)

(72) Inventors: Aravind Mohanaveeramani, Västerås (SE); Jan Svensson, Västerås (SE); Alireza Nami, Västerås (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/432,189

(22) PCT Filed: Feb. 28, 2019

(86) PCT No.: PCT/EP2019/054926
§ 371 (c)(1),
(2) Date: Aug. 19, 2021

(87) PCT Pub. No.: WO2020/173566
PCT Pub. Date: Sep. 3, 2020

(65) Prior Publication Data
US 2022/0085731 A1 Mar. 17, 2022

(51) Int. Cl.
*H02M 7/155* (2006.01)
*H02M 1/32* (2007.01)
(Continued)

(52) U.S. Cl.
CPC ........... *H02M 7/155* (2013.01); *H02M 1/325* (2021.05); *H02M 7/217* (2013.01); *H02M 7/4835* (2021.05)

(58) Field of Classification Search
CPC ........ H02H 9/041; H02H 3/023; H02H 3/087; Y02B 70/10; H02M 1/325; H02M 7/05;
(Continued)

(56) References Cited
U.S. PATENT DOCUMENTS 9,431,918 B2 * 8/2016 Zhang ............... H02M 7/53871
9,654,023 B2 5/2017 Elserougi et al.
(Continued)

FOREIGN PATENT DOCUMENTS

CN 201956689 U 8/2011
CN 102801295 B 1/2015
(Continued)

*Primary Examiner* — Gustavo A Rosario-Benitez
(74) *Attorney, Agent, or Firm* — Slater Matsil, LLP

(57) ABSTRACT

The present disclosure relates to a converter cell (4) for a power converter. The cell comprises a plurality of semiconductor devices (T) forming a half-bridge or full-bridge topology in the cell. The cell also comprises an energy storage (5) connected across the at least one switch leg (6). The cell also comprises a crowbar leg (7) connected across the at least one switch leg, comprising a plurality of series connected semiconductor crowbar switches (C) arranged to short-circuit the energy storage (5). The cell also comprises first and second AC terminals (A, B), wherein at least one of said AC terminals is connected to one of the at least one switch leg, between two of the plurality of series connected semiconductor devices of said switch leg, and connected to the crowbar leg, between two of the plurality of series connected crowbar switches of said crowbar leg.

8 Claims, 4 Drawing Sheets

(51) Int. Cl.
*H02M 7/217* (2006.01)
*H02M 7/483* (2007.01)

(58) Field of Classification Search
CPC ........ H02M 7/4835; H02M 7/04; H02M 7/12; H02M 7/10; H02M 1/32
See application file for complete search history.

(56) References Cited

U.S. PATENT DOCUMENTS

| | | |
|---|---|---|
| 2008/0232145 A1 | 9/2008 | Hiller et al. |
| 2009/0250799 A1 | 10/2009 | Billmann et al. |
| 2010/0085785 A1 | 4/2010 | Dommaschk et al. |
| 2011/0235221 A1* | 9/2011 | Vogeli .................... H02M 7/49 361/18 |
| 2013/0194840 A1* | 8/2013 | Huselstein .......... H02M 7/4837 363/50 |
| 2014/0049230 A1* | 2/2014 | Weyh .................... H02M 7/483 323/207 |
| 2014/0226374 A1 | 8/2014 | Hafneer et al. |
| 2015/0263720 A1* | 9/2015 | Moen ....................... H01H 9/56 307/115 |
| 2015/0349520 A1* | 12/2015 | Davidson .............. H02M 7/483 361/57 |
| 2016/0013730 A1* | 1/2016 | Neri ....................... H02M 1/096 363/84 |
| 2017/0077834 A1* | 3/2017 | Trainer ................ H02M 7/2173 |
| 2017/0358999 A1* | 12/2017 | Geske ................... H02M 7/219 |
| 2019/0131885 A1* | 5/2019 | Dorn .................... H03K 17/735 |
| 2019/0157968 A1* | 5/2019 | Tsuchiya ................ H02M 7/483 |
| 2019/0173393 A1* | 6/2019 | Chivite Zabalza ..... H02M 1/34 |
| 2019/0199237 A1 | 6/2019 | Dorn et al. |
| 2019/0280614 A1* | 9/2019 | Koyanagi ................ H02M 7/48 |
| 2019/0348925 A1* | 11/2019 | Barupati ............... H02M 7/4837 |
| 2020/0083800 A1* | 3/2020 | Steinke ................ H02M 7/483 |

FOREIGN PATENT DOCUMENTS

| | | |
|---|---|---|
| CN | 208257652 U | 12/2018 |
| GB | 2542789 A | 4/2017 |
| WO | 2008031372 A1 | 3/2008 |
| WO | 2018041370 A1 | 3/2018 |
| WO | 2018149493 A1 | 8/2018 |

\* cited by examiner

CONVERTER CELL WITH CROWBAR

CROSS-REFERENCE TO RELATED APPLICATIONS

This application is a national stage application of International Application No. PCT/EP2019/054926, filed on Feb. 28, 2019, which application is hereby incorporated herein by reference.

TECHNICAL FIELD

The present disclosure relates to a converter cell of a Modular Multilevel Chain-Link Converter (MMC).

BACKGROUND

MMCs have become a popular choice for the grid connected converters due to enhanced modularity, scalability and harmonic performance with reduced losses. Development towards cell level protection concepts has been a focus lately. In a so called shoot-through failure of a half-bridge (HB) or full-bridge (FB) MMC cell, the cell capacitor is short-circuited via a leg of semiconductor switches, leading to discharge of cell capacitor energy into the switches with very large currents, e.g. in the range of 500 kA to 1 MA for Static Synchronous Compensators (STATCOM) or in the range of 1-2 MA for High-Voltage Direct Current (HVDC) converters.

Gate Drivers (GD) are typically equipped with protection circuits to sense large currents and safely turn OFF (i.e. non-conducting) the switches. From past experiences, it has been identified that safe turn OFF using GD does not always work and it is may be mandatory to have secondary protection circuits. Two problems that an MMC cell should overcome during a shoot-through failure of the switches are:

- The large cell capacitor energy discharging into the switches may lead to either explosion, e.g. in case of industrial switch modules (for instance Insulated-Gate Bipolar Transistor, IGBT) using bond wires, or need for more expensive Presspack switches (for instance Integrated Gate-Commutated Thyristor (IGCT), Bi-Mode Insulated Gate Transistor (BiGT), Thyristor, StackPak IGBT or Injection-Enhanced Gate Transistor (IEGT)) with hermetic sealing to handle such energies.
- That it may be necessary to have a fast and stable bypass on the cell output before the switches explode or fail in high impedance mode during a shoot-through fault. It is to be noted that the current flowing through the cell output cannot be interrupted due to the presence of large arm reactors that would initiate an arc across the failed cell leading to significant damage of the valve structure of the converter.

To address these problems, a direct current (DC) crowbar thyristor connected across the cell capacitor can be used. When a shoot-through fault is detected, the crowbar thyristor is triggered to turn ON (i.e. conducting). The large inrush current from the capacitor is then shared between the failed leg of switches and the thyristor, relaxing the energy handling requirements of the switch packaging. The thyristor may be designed such that most of the capacitor energy is discharged via the thyristor rather than via the switches. The thyristor can fail short and remains at low impedance for a long time duration (e.g. >1 year), typically until the next service stop.

If the switches are e.g. Presspack IGCT, since it is a property of the IGCT to fail short while the diodes remain healthy, a stable cell output bypass through the diode bridge and failed thyristor may be obtained. Both of the problems mentioned above have been addressed by introducing the DC crowbar thyristor in the MMC cell.

FIG. 1a illustrates a converter cell during normal operation, while FIG. 1b illustrates when the DC crowbar thyristor is activated and goes into short circuit, whereby the cell is bypassed through the diodes.

It is to be noted that for this method to work, the diodes must remain healthy. For instance, industry IGBT modules use bond wires to connect the IGBT and diode chips to the power terminals. When a shoot-through failure occurs with a bond wire module, the bond wires may be damaged by the large inrush current, vaporizing the bond wires and the mechanical stress caused by the intense magnetic fields. Hence, this may lead to an open circuit failure, unlike in Presspack modules (e.g. IGCTs) which fail short circuit. An arc may be initiated within the IGBT module as the shoot-through currents are interrupted by the open circuit failure of the switches. This leads to increased temperature and eventually increased pressure inside the IGBT package and may ultimately lead to an explosion of the IGBT module. The gases expelled from the explosion along with the current interruption on the converter arm may then lead to arcing across the failed cell leading to further failure in the converter.

Thus, even when the crowbar thyristor is conducting, the diodes (antiparallel with the failed switches) may have to carry a large current during the negative half cycle of the resonance period which may reduce the lifetime and reliability of the bond wires even if they survive the shoot-through event itself. Hence a healthy diode cannot be guaranteed after such an event.

Having a DC crowbar thyristor can certainly prevent the explosion of the bond wire module. But the reliability of the diodes is at question after such an event and a reliable, low impedance, long term cell output bypass cannot be guaranteed.

SUMMARY

It is an objective of the present invention to provide a converter cell with improved handling of both DC capacitor discharge due to a shoot-through event and fast and reliable bypass of the failed cell.

According to an aspect of the present invention, there is provided a converter cell for a power converter. The cell comprises a plurality of semiconductor devices forming a half-bridge or full-bridge topology in the cell with at least one switch leg comprising a plurality of the semiconductor devices connected in series, each semiconductor device comprising a switch and an anti-parallel diode. The cell also comprises an energy storage connected across the at least one switch leg. The cell also comprises a crowbar leg connected across the at least one switch leg, said crowbar leg comprising a plurality of series connected semiconductor crowbar switches arranged to short-circuit the energy storage when the crowbar switches are switched to conducting. The cell also comprises first and second AC terminals, wherein at least one of said AC terminals is connected to one of the at least one switch leg, between two of the plurality of series connected semiconductor devices of said switch leg, and connected to the crowbar leg, between two of the plurality of series connected crowbar switches of said crowbar leg, whereby the first and second AC terminals are arranged to bypass the semiconductor devices via one of said crowbar switches when said one crowbar switch is switched to conducting.

According to another aspect of the present invention, there is provided a power converter, e.g. an MMC, comprising a plurality of series connected converter cells of the present disclosure.

By the use of a plurality of series connected crowbar switches (e.g. thyristors), the cell bypass path between the output terminals may be formed via at least one of said crowbar switches instead of via the antiparallel diodes of the failed switches, improving the fault handling and reliability of the cell and thus the whole converter.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

The invention proposes a split DC crowbar arrangement, having a plurality of one-directional crowbar switches in series, to provide a fast and reliable cell output bypass in addition to the handling of a capacitor energy discharge. The crowbar switches are herein exemplified with thyristors, which is preferred in some embodiments of the invention, but it should be noted that other semiconductor switches may alternatively be used in other embodiments. Advantageous properties of thyristors as crowbar switches include that they can be fast switched to conducting and then remain conducting at low impedance for a long time after failure. Additionally they are available in hermetically sealed packages capable of handling very high discharge energies making them suitable for Crowbar applications.

Figure 1A:
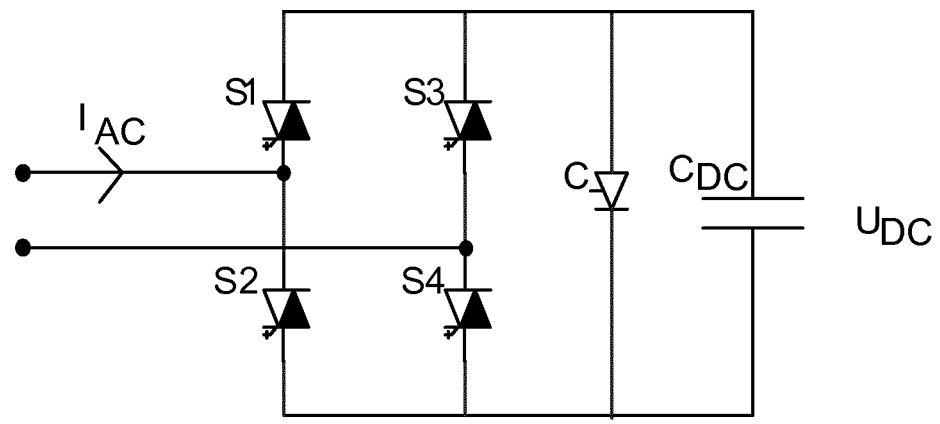
FIGS. 1a and 1b illustrate a converter cell according to prior art.
Figure 1B:
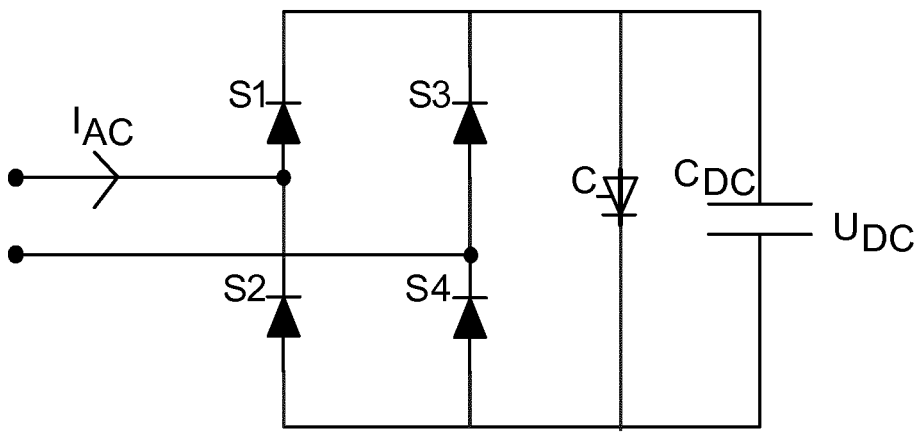
Figure 2:
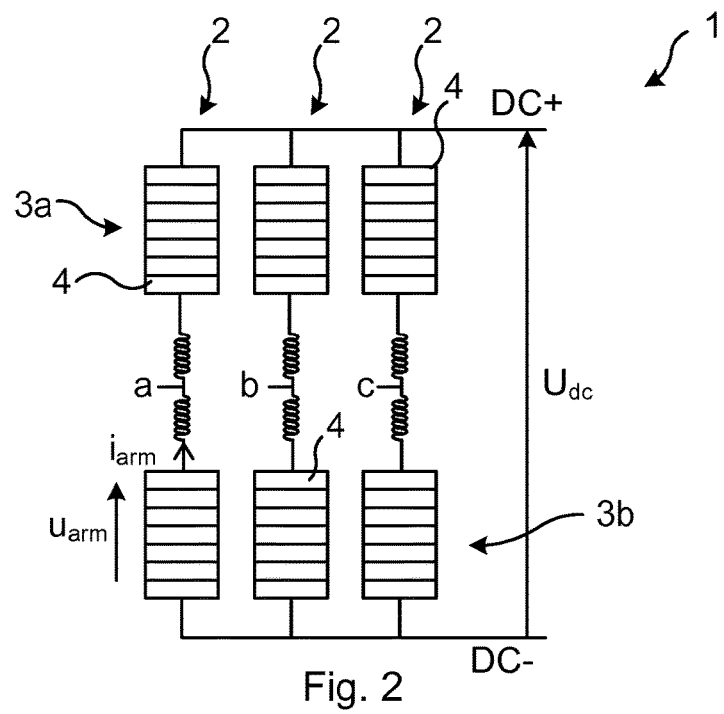
FIG. 2 is a schematic circuit diagram of a power converter, here in the form of an MMC in double-star topology, in accordance with embodiments of the present invention.

FIG. 2 illustrates a power converter 1, here in the form of an MMC having converter arms 3 of series connected (also called chain-link or cascaded) converter cells 4, here an Alternating Current (AC) to Direct Current (DC) converter 1 in double-star (also called double-wye or double-Y) topology comprising three phases 2, each having a first converter arm 3a connected to the positive DC terminal $DC^+$ and a second converter arm 3b connected to the negative DC terminal $DC^-$, each arm shown in series with an arm reactor.

MMC or double Wye converter topology are herein presented as an example. The developed cell protection method is applicable to any converter cell 4 for a power converter 1, e.g. that can be used to build any chain-link topology such as Delta, Wye, double Wye, Modular Matrix converters, etc. Also, the converter 1 is not limited to an AC-DC converter as shown in the figure, but may e.g. be an AC-AC converter or a Static Synchronous Compensator (STATCOM).

Figure 3A:
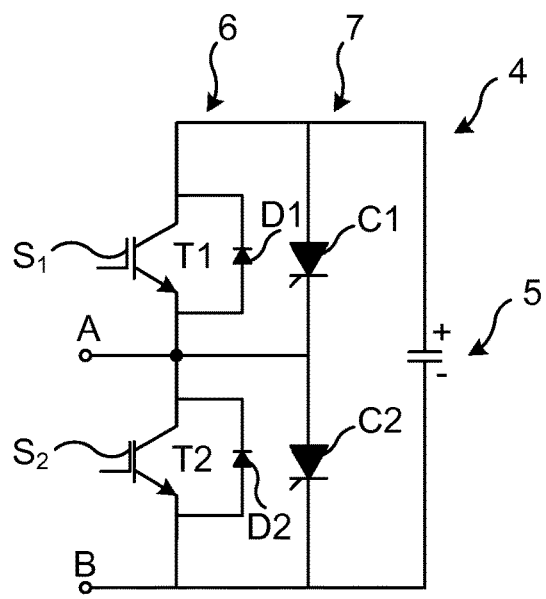
FIG. 3a is a schematic circuit diagram of a half-bridge converter cell, in accordance with embodiments of the present invention.
Figure 3B:
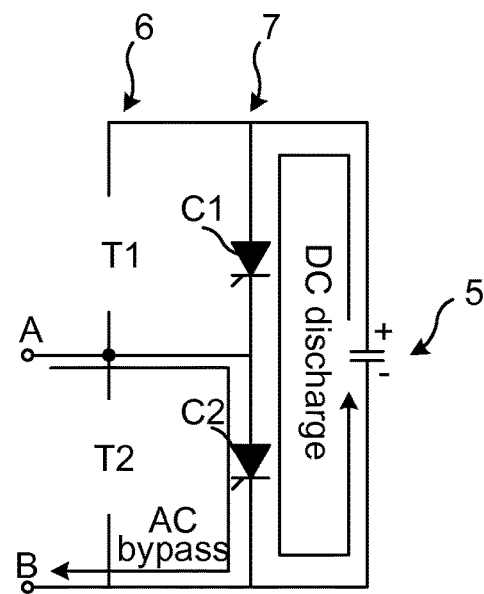
FIG. 3b is a schematic circuit diagram illustrating the DC energy storage discharging path and the AC bypass path in the half-bridge converter cell of FIG. 3a when the crowbar leg is conducting, in accordance with embodiments of the present invention.
Figure 4A:
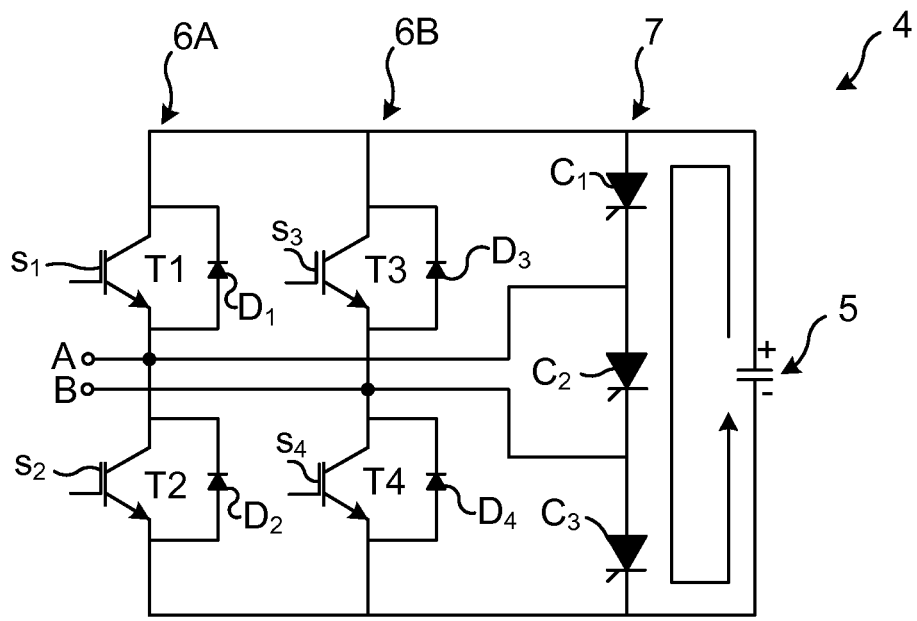
FIG. 4a is a schematic circuit diagram of a full-bridge converter cell, in accordance with embodiments of the present invention.

The proposed split DC crowbar arrangement for HB and FB cells 4 is shown in FIGS. 3 and 4, respectively. Each cell comprises an energy storage 5, e.g. comprising a capacitor, supercapacitor or battery arrangement, and at least one switch leg 6 connected across (i.e. in parallel with) the energy storage 5 and comprising at least two semiconductor devices T. Each semiconductor device T comprises a one-directional switch S and an antiparallel diode D. An HB cell 4 as in FIG. 3 typically comprises a single switch leg 6 having a first semiconductor device T1 and a second semiconductor device T2 in series. An FB cell 4 as in FIG. 4 typically comprises both a first switch leg 6a and a second switch leg 6b, where the additional second switch leg 6b is connected in parallel with the first switch leg 6a and comprises a first semiconductor device T3 and a second semiconductor device T4 in series.

For a HB cell 4, two crowbar switches (thyristors) C, a first thyristor C1 and a second thyristor C2, each capable of withstanding the full DC voltage, are connected in series in a crowbar leg 7 connected in parallel to the cell capacitor 5 (and thus also in parallel with the switch leg 6) with minimal inductance. In the event of a shoot-through failure where the GD fails to turn OFF the healthy switch S successfully (or open circuit failure of a switch), the DC crowbar thyristors C are triggered to turn ON.

As seen from past experiences, the thyristors C would conduct most of the cell capacitor energy, relaxing the energy handling requirements of the switch S modules. Thus, an explosion of the bond wire modules may be prevented. Also, the thyristors fail (conduct) into low impedance, long time duration, short circuit mode after conducting such large amounts of energies. Hence, as seen from the illustration of FIG. 3b, the cell output is bypassed by the conducting second thyristor C2. This does not depend on the diodes D for the cell output bypass. A single gate pulse trigger can be paralleled to all the thyristors since it is not of concern how the thyristors are triggered. It is to be noted that though two series connected thyristors of cell DC voltage rating is required, the energy handling capabilities of each thyristor is reduced to half compared to a single thyristor.

Figure 4B:
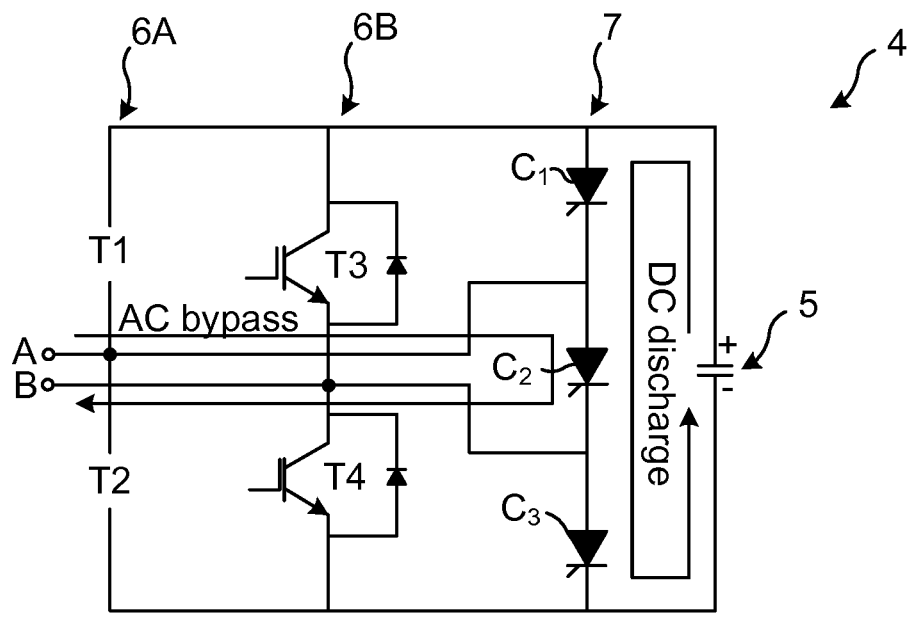
FIG. 4b is a schematic circuit diagram illustrating the DC energy storage discharging path and the AC bypass path in the full-bridge converter cell of FIG. 4a when the crowbar leg is conducting, in accordance with embodiments of the present invention.

The same is in applicable parts true for a FB cell 4. Three thyristors C, a first thyristor C1, a second thyristor C2 and a third thyristor C3, connected in series, each capable of withstanding the full DC voltage but typically with only ⅓ energy handling capability, are connected in parallel to the cell capacitor 5 with minimal inductance. In the event of a shoot-through failure, all three thyristors are triggered to turn ON. As seen in FIG. 4b, the cell output is, as for the HF cell, bypassed by the conducting second thyristor C2.

For both HF and FB cells 4, the semiconductor devices T, especially the diodes D thereof, can be bypassed with regard to the AC conduction path through the cell between the first AC terminal A and the second AC terminal B. As shown in FIGS. 3 and 4, the first AC terminal A is connected (typically by direct galvanic connection) to both the a switch leg (here the only switch leg 6 for a HF cell and to the first switch leg 6a for a FB cell), between the first and second semiconductor devices T1 and T2 thereof, and to the crowbar leg 7, between the first and second crowbar switches C1 and C2 thereof.

Additionally, for a FB cell and as shown in FIG. 4, the second AC terminal B is connected (typically by direct galvanic connection) to both the second switch leg 6b, between the first and second semiconductor devices T3 and T4 thereof, and to the crowbar leg 7, between the second and third crowbar switches C2 and C3. For a HB cell, the second AC terminal B may be connected in a conventional manner as shown in FIG. 3.

Figure 5:
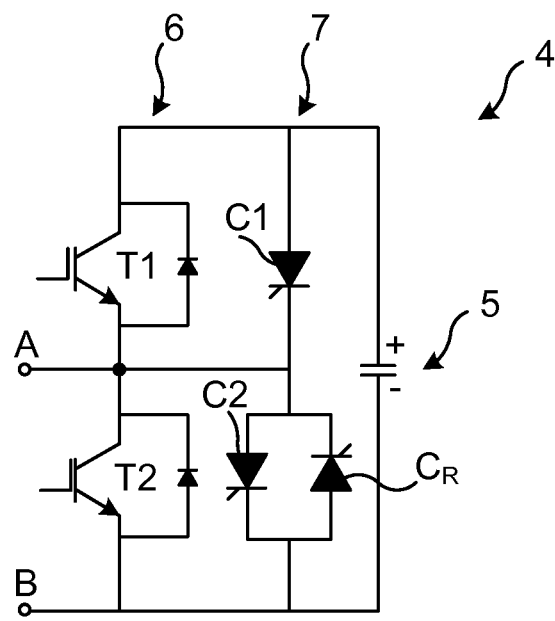
FIG. 5 is a schematic circuit diagram of a half-bridge converter cell with a reverse crowbar switch, in accordance with embodiments of the present invention.

In some embodiments, one, some or all of the crowbar switches C may be complemented with an antiparallel reverse crowbar switch CR, e.g. comprising a thyristor. Some examples of this are illustrated in FIG. 5 and for a HF and a FB cell 4, respectively. As can be seen, it may be especially useful with a reverse crowbar switch which is antiparallel to the second crowbar switch C2, as shown in the FIGS. 5 and 6 in order to be able to handle e.g. a DC pole-to-pole fault, where there is a current running in an opposite direction, from the negative DC terminal DC⁻ to the positive DC terminal DC⁺. The reverse crowbar switch may then form a bi-directional switching device together with the crowbar switch C that it is antiparallel to, e.g. a Bi-Directional Controlled Thyristor (BCT) which may also be called a Phase Control Thyristor (PCT).

Figure 6:
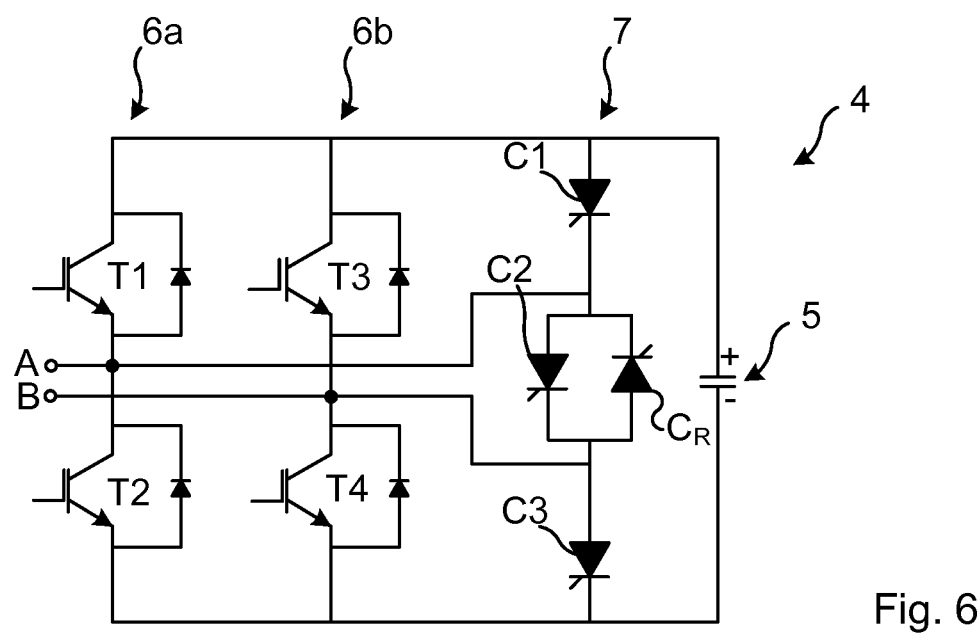
FIG. 6 is a schematic circuit diagram of a full-bridge converter cell with a reverse crowbar switch, in accordance with embodiments of the present invention.

As can be seen in FIGS. 5 and 6, in case of an opposite-direction current, a current can flow from the second AC terminal B to the first AC terminal A via the reverse crowbar switch CR.

One of the critical faults for e.g. MMC HB is the DC pole-to-pole fault. With such a fault, the diodes D (D2 in case of HB, D2 and D3 in case of FB) carry large currents (e.g. in the range of 10-20 kA) limited only by the arm reactor impedance, typically for a half to one fundamental cycle until the AC breaker trips to break the current. This puts a requirement on the diode surge current rating. With bond wire modules, the diode surge current rating (i.e., ratio of surge current to nominal current) may be relatively limited compared to a Presspack device. If the second crowbar switch C2 with the proposed split DC crowbar protection is replaced with e.g. a BCT, then the reverse crowbar switch can be triggered to turn ON for such a fault case. The reverse crowbar switch CR would then share the fault current with the diode, increasing the surge current handling capability of the diode significantly. It also helps to increase the lifetime of the bond wire diodes for such fault cases.

Further, it has been seen that STATCOM may require handling of very high Transient Overvoltage (TOV) of up to 2.1 p.u. (per unit). In such cases, the converter arms 3 are usually over-rated (up to 50% with increased reactor impedance) to handle such high TOV. During normal operation i.e., with 1.0 p.u. voltage at the Point of Common Coupling (PCC), many cells (around 30%) are bypassed normally, which cells are mainly required only during the TOV condition. To bypass a FB cell either both first switches S1 and S3 or both second switches S2 and S4 are turned ON. With the proposed split DC crowbar, having a reverse crowbar switch CR antiparallel with the second crowbar switch C2 (see FIG. 6), the reverse crowbar switch CR can be turned ON to bypass the cell to reduce the conduction losses since only one switch is used to bypass the cell rather than two switches. During TOV, the converter 1 is operated in inductive mode which naturally aids the thyristor commutation bringing back the cell 4 from bypass mode to cell insert mode.

In some embodiments of the present invention, the power converter 1 is an MMC comprising a plurality of series-connected (cascaded or chain-linked) converter cells of the present disclosure. The power converter 1 may have any suitable topology. MMC or double-Star (-Wye) converter topology are herein presented as an example. The developed cell protection method is applicable to any converter cell 4 for a power converter 1, e.g. that can be used to build any chain-link topology such as Delta, Wye, double Wye, Modular Matrix converters, etc. Also, the converter 1 is not limited to an AC-DC converter as shown in the figure, but may e.g. be an AC-AC converter or a Static Synchronous Compensator (STATCOM). In some embodiments, as is currently preferred for some applications, the MMC is an AC-to-DC converter, e.g. in a double-star topology.

In some embodiments of the present invention, the at least one switch leg 6 consists of one switch leg, comprising a first T1 and a second T2 semiconductor device, forming a half-bridge topology. Then, in some embodiments, the plurality of series connected semiconductor crowbar switches C consists of a first C1 and a second C2 crowbar switch. Then, in some embodiments, the first AC terminal A is connected to the switch leg 6 between the first and second semiconductor devices T1 and T2, and connected to the crowbar leg 7 between the first and second crowbar switches C1 and C2.

In some other embodiments of the present invention, the at least one switch leg consists of a first switch leg 6a and a second switch leg 6b, each switch leg comprising a first semiconductor device T1 or T3 and a second semiconductor device T2 or T4, forming a full-bridge topology. Then, in some embodiments, the plurality of series connected semiconductor crowbar switches consists of a first C1, a second C2 and a third C3 crowbar switch.

Then, in some embodiments, the first AC terminal A is connected to the first switch leg 6a between the first and second semiconductor devices T1 and T2 thereof, and connected to the crowbar leg 7 between the first and second crowbar switches C1 and C2, and the second AC terminal B is connected to the second switch leg 6b between the first and second semiconductor devices T3 and T4 thereof, and connected to the crowbar leg 7 between the second and third crowbar switches C2 and C3.

In some embodiments of the present invention, a reverse crowbar switch CR is connected across the second crowbar switch C2, antiparallel to the second crowbar switch, whereby the reverse crowbar switch CR is arranged to allow current to flow from the second terminal B to the first terminal A via said reverse crowbar switch when said reverse crowbar switch is switched to conducting. In some embodiments, the second crowbar switch C2 and the reverse crowbar switch CR are comprised in a Bidirectional Control Thyristor (BCT).

In some embodiments of the present invention, each of the crowbar switches C comprises a thyristor. Using a thyristor may be convenient but other suitable semiconductor switches may alternatively be used.

In some embodiments of the present invention, each of the switches S of the semiconductor devices T comprises an Insulated-Gate Bipolar Transistor (IGBT), a Bi-Mode Insulated Gate Transistor (BiGT), or an Integrated Gate-Commutated Thyristor (IGCT), preferably an IGBT which is suitable for some applications.

In some embodiments of the present invention, each of the switches S of the semiconductor devices T is connected via bond wires. As discussed above, the present invention may be especially useful when bond wires are used, but embodiments of the invention may also be used when bond wires are not used.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A converter cell for power converter systems, the cell comprising:
   a plurality of semiconductor devices forming a full-bridge topology in the cell with at least one switch leg comprising a plurality of the semiconductor devices connected in series, each semiconductor device comprising a switch and an anti-parallel diode;
   an energy storage connected across the at least one switch leg;
   a crowbar leg connected across the at least one switch leg, the crowbar leg comprising a plurality of series connected semiconductor crowbar switches arranged to short-circuit the energy storage when the crowbar switches are switched to conducting; and
   first and second AC terminals, wherein at least one of the AC terminals is connected to one of the at least one switch leg, between two of the plurality of series connected semiconductor devices of the switch leg, and connected to the crowbar leg, between two of the plurality of series connected crowbar switches of the crowbar leg, whereby the first and second AC terminals are arranged to bypass the semiconductor devices via one of the crowbar switches when the one crowbar switch is switched to conducting,
   wherein the at least one switch leg consists of a first and a second switch leg, each comprising a first and a second semiconductor device,
   wherein the plurality of series connected semiconductor crowbar switches consists of a first, a second and a third crowbar switch,
   wherein the first AC terminal is connected to the first switch leg between the first and second semiconductor devices thereof, and connected to the crowbar leg between the first and second crowbar switches, and the second AC terminal is connected to the second switch leg between the first and second semiconductor devices thereof, and connected to the crowbar leg between the second and third crowbar switches, and
   wherein a reverse crowbar switch is connected across the second crowbar switch, antiparallel to the second crowbar switch, and arranged to allow current to flow from the second AC terminal to the first AC terminal via the reverse crowbar switch when switched to conducting.

2. The converter cell of claim 1, wherein the second crowbar switch and the reverse crowbar switch are comprised in a Bidirectional Control Thyristor.

3. The converter cell of claim 1, wherein each of the crowbar switches comprises a thyristor.

4. The converter cell of claim 1, wherein each of the switches of the semiconductor devices comprises an Insulated-Gate Bipolar Transistor (IGBT), Bi-Mode Insulated Gate Transistor (BiGT), or an Integrated Gate-Commutated Thyristor (IGCT).

5. The converter cell of claim 1, wherein each of the switches of the semiconductor devices is connected via bond wires.

6. A power converter comprising a plurality of series connected converter cells of claim 1.

7. The power converter of claim 6, wherein the power converter is a Modular Multilevel Converter.

8. The power converter of claim 6, wherein the power converter is an AC-to-DC converter in a double-star topology.

* * * * *